(12) United States Patent
Miller (10) Patent No.: US 10,408,913 B2
(45) Date of Patent: Sep. 10, 2019

(54) SYSTEMS AND METHODS FOR PHYSICAL DETECTION USING RADIO FREQUENCY NOISE FLOOR SIGNALS AND DEEP LEARNING TECHNIQUES

(71) Applicant: SWFL, Inc., Reno, NV (US)

(72) Inventor: Jeremie Miller, Reno, NV (US)

(73) Assignee: SWFL, Inc., Reno, NV (US)

(*) Notice: Subject to any disclaimer, the term of this patent is extended or adjusted under 35 U.S.C. 154(b) by 0 days.

(21) Appl. No.: 16/055,361

(22) Filed: Aug. 6, 2018

(65) Prior Publication Data

US 2019/0049548 A1    Feb. 14, 2019

Related U.S. Application Data

(60) Provisional application No. 62/543,257, filed on Aug. 9, 2017.

(51) Int. Cl.

| | |
|---|---|
| *G01S 3/02* | (2006.01) |
| *H04B 17/391* | (2015.01) |
| *G01S 5/02* | (2010.01) |
| *H04B 17/345* | (2015.01) |
| *G06N 20/00* | (2019.01) |
| *G06K 9/00* | (2006.01) |

(52) U.S. Cl.
CPC .......... *G01S 5/0252* (2013.01); *G06K 9/0055* (2013.01); *G06N 20/00* (2019.01); *H04B 17/345* (2015.01); *H04B 17/3912* (2015.01); *G06K 2209/27* (2013.01); *G06K 2209/40* (2013.01)

(58) Field of Classification Search
CPC ..... G06F 15/18; G06K 9/0055; G01S 5/0252; H04B 17/3912; G06N 20/00
USPC ......... 342/451, 458, 463, 465; 382/159, 160
See application file for complete search history.

(56) References Cited

U.S. PATENT DOCUMENTS

| | | |
|---|---|---|
| 8,660,212 B2 | 2/2014 | Ponnuswamy |
| 2013/0288734 A1 | 10/2013 | Mody et al. |
| 2015/0189528 A1 | 7/2015 | Carbajal |

OTHER PUBLICATIONS

International Search Report and Written Opinion for PCT Application No. PCT/US2018/045323 dated Oct. 16, 2018.

*Primary Examiner* — Dao L Phan
(74) *Attorney, Agent, or Firm* — Jeffrey Schox; Padowithz Alce (57) ABSTRACT

Systems and methods of using a machine learning model to detect physical characteristics of an environment based on radio signal data include at a radio signal receiver, collecting noise floor signal data comprising radio signal data from an environment within a predetermined proximity of the radio signal receiver; implementing a trained deep machine learning classifier that is trained to classify one or more physical characteristics of the environment based on the radio signal data; generating machine learning input based on the radio signal data collected by the radio signal receiver; receiving the machine learning input at the trained deep machine learning classifier; and generating by the trained deep machine learning model one or more classification labels identifying the one or more physical characteristics of the environment based on the noise floor signal data.

14 Claims, 4 Drawing Sheets

```
┌─────────────────────────────────────────────────┐
│       Collecting Signal Data Samples S210       │
└─────────────────────────────────────────────────┘

┌─────────────────────────────────────────────────┐
│  Collecting Signal Data from Varying Environments S215  │
└─────────────────────────────────────────────────┘

┌─────────────────────────────────────────────────┐
│       Preprocessing Signal Sample Data S220     │
└─────────────────────────────────────────────────┘

┌─────────────────────────────────────────────────┐
│        Defining Parameters of ML Model S225     │
└─────────────────────────────────────────────────┘

┌─────────────────────────────────────────────────┐
│       Providing Training Data to ML Model S230  │
└─────────────────────────────────────────────────┘

┌─────────────────────────────────────────────────┐
│          Generating Trained ML Model S240       │
└─────────────────────────────────────────────────┘

┌─────────────────────────────────────────────────┐
│            Deploying the Trained ML Model       │
└─────────────────────────────────────────────────┘
```

Collecting Signal Data from a Zone S310

Applying Signal Processing S315

Providing Signal Data to Deep ML Model S320

Detecting Physical Conditions/Events by Deep ML Model S330

FIGURE 3

SYSTEMS AND METHODS FOR PHYSICAL DETECTION USING RADIO FREQUENCY NOISE FLOOR SIGNALS AND DEEP LEARNING TECHNIQUES

CROSS-REFERENCE TO RELATED APPLICATIONS

This application claims the benefit of U.S. Provisional Application No. 62/543,257, filed 9 Aug. 2017, which is incorporated in its entirety by this reference.

TECHNICAL FIELD

The inventions of the present application relate generally to the field of radio detection using radio frequency and machine learning, and more specifically to improved systems and methods for using machine learning to detect changes to the noise floor of an environment to determine pre-trained sensory conditions.

BACKGROUND

Despite many advances in modern sensor technology, there still lacks a sensor solution that is sufficiently flexible and comprehensive to detect varying physical conditions and/or events within physical environments. Today, for detecting physical properties of an environment and/or changes in one or more objects in an environment, multiple sensors may be deployed, each of which can measure some characteristic of the environment and/or object within the environment. These multiple sensors may vary in type, characteristics, and complexity and may include sensors, such as temperature sensors, position sensors, movement sensors, and the like. Because the sensing functionalities performed by each of these type of sensors is different, multiple sensors having different hardware and configurations are often required to achieve the desired sensing in a single environment.

Thus, there is a need in the field of radio detection to create new and useful systems and methods for comprehensive dynamic detection of physical characteristics in an environment. The below-described embodiments of the present application provide such advanced detection techniques and systems.

SUMMARY OF THE INVENTION

In one embodiment, a system for deploying a deep machine learning classifier that classifies pre-trained sensory conditions within a physical environment based on radio frequency noise floor signal data comprises: one or more radio signal receivers that: are set to receive radio signals from an unused radio frequency band, wherein the unused radio frequency band relates to a radio frequency band that is not used by one or more active radio signal sources within a predetermined distance of the one or more radio signal receivers; collect radio signal data within the unused radio frequency band from one or more regions within the predetermined distance of each of the one or more radio signal receivers; a machine learning system that includes a trained deep machine learning classifier, wherein the trained deep machine learning classifier is trained to identify pre-trained sensory conditions based on the collected radio signal data, wherein the machine learning system: receives machine learning input comprising the collected radio signal data from the one or more radio signal receivers; outputs one or more classification labels that identifies one or more pre-trained sensory conditions within the one or more regions based on the collected radio signal data.

In one embodiment, the one or more classification labels are collected as input by one or more autonomous devices, and in response to collecting the one or more classification labels, triggering one or more automatic actions by the one or more autonomous devices, wherein the one or more automatic actions by the one or more autonomous devices includes one or more of recording details of the one or more pre-trained sensory conditions associated with the one or more classification labels, performing an actuation in response to detecting the one or more pre-trained sensory conditions, and generating and transmitting a communication comprising details of the one or more pre-trained sensory conditions.

In one embodiment, the system comprises a plurality of radio frequency receivers, wherein each of the plurality of radio frequency receivers collects radio signal within a distinct unused radio frequency band from the one or more regions within the predetermined distance of each of the plurality of radio frequency receivers.

In one embodiment, the system comprises one or more physical event sources that generate radio frequency signals that affect noise floor values in the one or more regions, wherein the one or more physical event sources include non-bio-logical or biological physical objects that affect noise affect noise floor values in the one or more regions monitored by the one or more radio signal receivers.

In one embodiment, a method of using a machine learning model to detect physical characteristics of an environment based on radio signal data comprises at a radio signal receiver, collecting noise floor signal data comprising radio signal data from an environment within a predetermined proximity of the radio signal receiver; implementing a trained deep machine learning classifier that is trained to classify one or more physical characteristics of the environment based on the radio signal data; generating machine learning input based on the radio signal data collected by the radio signal receiver; receiving the machine learning input at the trained deep machine learning classifier; and generating by the trained deep machine learning model one or more classification labels identifying the one or more physical characteristics of the environment based on the noise floor signal data.

In one embodiment, the trained deep machine learning classifier is trained to classify a plurality of distinct physical characteristics of the environment or a plurality of distinct sensory conditions within the environment.

In one embodiment, the plurality of distinct sensory conditions within the environment include one or more of an operation of machinery, a presence of a vehicle, a presence of a human, a time of day, and a weather condition.

In one embodiment, collecting noise floor signal data of the environment includes: selecting an unused radio frequency band, wherein the selecting includes selecting a radio frequency band that is not used by one or more radio signal sources in the environment within the predetermined proximity of the radio frequency receiver; and collecting radio signal data within the unused radio frequency band from the environment within the predetermined proximity of the radio frequency receiver.

In one embodiment, the method includes training the trained deep machine learning classifier, wherein the training includes: collecting by a radio signal receiver at a set radio frequency band one or more samples of noise floor signal data from a physical environment for at least one active sensory condition; and providing training data to a deep machine learning classifier, wherein the training data comprises one or more portions of the one or more samples of noise floor signal data for the at least one active sensory condition.

In one embodiment, the method includes preprocessing the samples of noise floor signal data by applying one or more signal processing functions to the collected noise floor signal data including one or more of: performing fast Fourier Transform of one or more portions of the noise floor signal data; and implementing a radio frequency spectrum analyzer that generates one or more graphical representations of the noise floor signal data, wherein the training data comprises the one or more portions of the noise floor signal data that is transformed by fast Fourier Transform and the one or more graphical representations of the noise floor signal data.

In one embodiment, the method includes generating a noise floor model for each of a plurality of distinct sensory conditions based on the samples of noise floor signal data; providing training data comprising the noise floor model for each of the plurality of distinct sensory conditions.

In one embodiment, the one or more classification labels are collected as input by one or more autonomous devices, and in response to collecting the one or more classification labels, triggering one or more automatic actions by the one or more autonomous devices, wherein the one or more automatic actions by the one or more autonomous devices includes one or more of recording details of the one or more pre-trained sensory conditions associated with the one or more classification labels, performing an actuation in response to detecting the one or more pre-trained sensory conditions, and generating and transmitting a communication comprising details of the one or more pre-trained sensory conditions.

In one embodiment, collecting noise floor signal data includes: generating a plurality noise floor signal sample data sets, wherein each of the plurality of noise floor signal sample data sets comprises radio signal data relating to a distinct sensory condition.

In one embodiment, the method includes augmenting each of the plurality of noise floor signal data sets with machine learning classification data that identifies or describes the distinct sensory condition associated with each respective noise floor signal data set of the plurality of radio signal data sets.

In one embodiment, the method includes implementing a plurality of networked radio signal receivers, wherein each of the plurality of networked radio signal receivers implements a distinctly trained deep machine learning classifier, wherein the distinctly trained deep machine learning classifier at each of the plurality of networked radio signal receivers classify different sets of pre-trained sensory conditions.

In one embodiment, if the one or more samples of noise floor signal data from the physical environment that are collected by the radio signal receiver are insufficient for training the deep machine learning, generating additional machine learning input by modifying one or more features of the one or more samples of noise floor signal data to generate one or more samples of artificial noise signal data; providing to the trained deep machine learning classifier training data comprising the one or more samples of artificial noise signal data.

In one embodiment, the method includes at a second radio signal receiver: collecting noise floor signal data from the environment using a different unused radio frequency band; augmenting the machine learning input with the noise floor signal data collected by the second radio frequency receiver; generating by the trained deep machine learning model one or more classification labels identifying the one or more physical characteristics of the environment based on the noise floor signal data from the radio signal receiver and the second radio signal receiver.

DESCRIPTION OF THE PREFERRED EMBODIMENTS

The following description of preferred embodiments of the invention is not intended to limit the invention to these preferred embodiments, but rather to enable any person skilled in the art to make and use this invention.

Overview

As discussed above, in many instances, traditional radar and/or sensor devices may be used to detect physical properties and/or changes in an environment. The complex and power hungry nature of radar can make the use of radar less desirable to use in circumstances in which low cost, low complexity radio detection is required. In an environment in which unique and/or many physical properties require monitoring, specifically designed hardware sensors may be needed to achieve each of the specific sensing functionalities required with the environment. While some combination of radar and specifically designed hardware sensors may be implemented to perform desired sensing functionalities for particular a space and/or environment, it may be highly cost prohibitive to implement such a solution.

By contrast, in the one or more embodiments of the present application, the systems and methods may function to implement a software-defined radio frequency (RF) receiver that may be configured to detect any type of physical change and/or measure varying physical properties of an environment and preferably, without complex architecture resulting in a low cost, low power radio frequency sensor.

Specifically, one or more embodiments of the present application function to perform automated detection of physical properties and/or of events proximate to a radio frequency receiver that functions to process noise floor signals with a machine learning model (preferably a deep learning model) to determine pre-trained sensory conditions. In many of the embodiments described herein, the noise floor relates to or refers to a measure of the signal created from a sum of noise sources and various signals within a measurement system (e.g., a defined environment, a defined zone or area, etc.). In such embodiments, the aggregated noise signals defining the noise floor typically include any signal other than a specific signal being monitored within the measurement system. The various signals comprising the noise floor may include naturally occurring and/or artificial (e.g., manmade) signals including, but not limited to, thermal noise, black body, cosmic noise, seismic noise, atmospheric noise, incidental noise (e.g., man-made RF signals), any electromagnetic field sources, and the like.

Additionally, some of the embodiments of the present application may be directed to training the one or more deep learning models to classify noise floor models for each of a plurality of environments and further, to detect and classify physical events measured within noise floor signals. For example, based on training data input associated with each of a plurality of natural and/or artificial environments, one or more deep learning models may be trained to infer or classify an environment type (e.g., indoor, outdoor, raining, clear, etc.) and provide estimated noise model characteristics. In another example, a deep learning model may be trained using signal samples for each of a plurality of event types (e.g., actuation of device, a temperature change, etc.) that may occur in an environment and once trained, the deep learning model may be able to classify different events within an environment based on receiving one or more noise floor samples as data input.

A deep learning model as referred to herein typically refers to a machine learning model that includes deep structured learning or hierarchical learning that includes multiple layers for data processing and classification or providing an inference or knowledge about some dataset. A common application of a deep learning model includes an artificial neural network in which each layer includes multiple connected neurons emulating neural connections of a human brain. While a deep learning model may take longer to train than a fast learning model, the multiple layers of connected neurons and the like implemented in many deep learning models allow for a deeper and more accurate processing of input data thereby allowing more accurate classification of data and/or more accurate generation of inferences from data.

Accordingly, the embodiments of the present application may advantageously use advanced signal processing techniques together with a deep learning model to accurately interpret complex physical signals and event signals detected within the radio frequency noise floor. Traditional radar and sensors have not been able to achieve such technical advantage.

Figure 1:
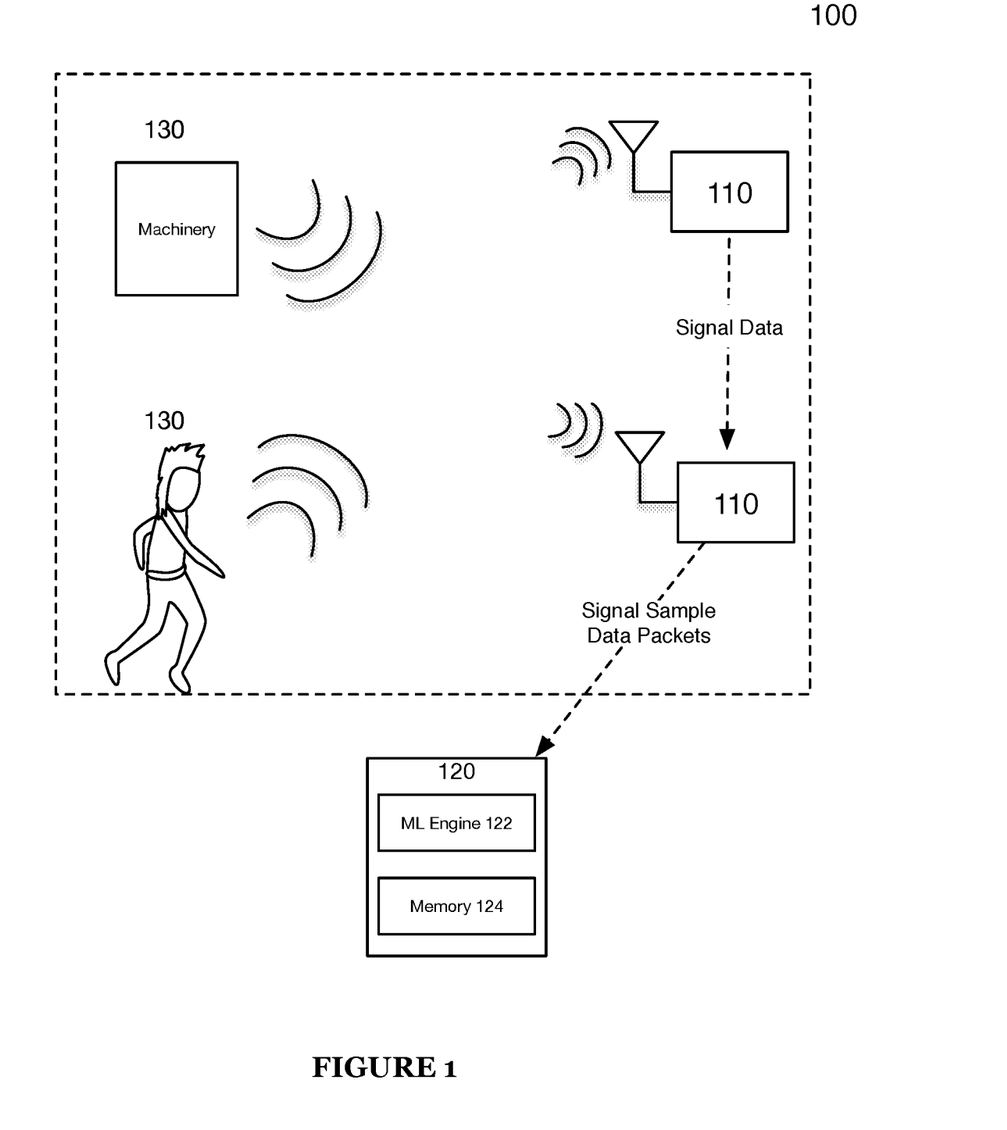
FIG. 1 illustrates a system 100 in accordance with one or more embodiments of the present application.

1. System for Training a Machine Learning Model to Detect Physical Events within Radio Frequency Noise Floor Signals As shown in FIG. 1, a system 100 for training a machine learning model to classify sensory conditions within a physical environment using radio frequency noise floor signal data and event signal data includes one or more signal receivers 110, a machine learning system 120 that includes a machine learning engine 122, and one or more physical event sources 130.

In a training phase of a machine learning model, the system 100 functions to use the one or more radio frequency receivers 110 to RF signal sample data to be used as machine learning training input into the machine learning system 120. The system 100 may configure the one or more radio frequency receivers to collect RF signals from one or more unused RF bandwidths within an environment over various periods of time. Using signal processors at either the one or more radio frequency receivers 110 and/or the machine learning system 120, the system 100 may preprocess the collected RF signals into multiple sets of RF sample data. The system 100 may aggregate portions of the RF signal samples into sets that define noise floor signal values for different environments and additionally, aggregate portions of the RF signal samples into sets that define physical events occurring within an environment and that affect the noise floor signal values.

The system 100 may function to use, as machine learning input into the machine learning system 120, the generated sets of signal sample data to train one or more machine learning models via the machine learning engine 122. Resultantly, the system 100 preferably functions to output one or more machine learning models that function to ingest noise floor signal data and accurately classify the environment and particular sensory conditions and events within the environment.

The machine learning system 120 functions to train one or more machine learning models via the machine learning engine 122. The machine learning engine 122 may include a variety of selectable training algorithms, hyperparameters, training data, and the like that may be used in one or more machine learning training processes. Additionally, the machine learning system 120 functions to identify or classify features of the collected RF signal sample data collected by the radio frequency receiver 110. The machine learning system 120 may be implemented by one or more computing servers having one or more computer processors (e.g., graphics process units (GPU), central processing units (CPUs, MCUs, etc.), or a combination of web servers and private servers) that may function to implement one or more ensembles of machine learning models. The ensemble of machine learning models may include multiple machine learning models that work together to classify features of signal sample data of physical events. The machine learning system 120 may be in operable communication with the one or more signal receivers 110 and may function to communicate via one or more wired or wireless communication networks. For instance, the one or more signal receivers may collect and/or generate input data that may be transmitted to the machine learning system 120 via the communication networks. The machine learning system 120 may additionally utilize input from various other data sources (e.g., outputs of system 100, system 100 derived knowledge data, external entity-maintained data, etc.) to continuously improve or accurately tune weightings associated with features of the one or more of the machine learning models of the system 100.

The machine learning system 120 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in determining pre-trained sensory conditions and/or other data relevant to the system 100.

Additionally, the machine learning system may include memory 124 that includes random access memory (RAM), read-only memory (ROM), and/or other non-transitory computer-readable storage devices for storing computer instructions, applications, program modules, data structures, and the like that may be used for implementing one or more aspects of the training and/or deployment of the machine learning model.

While the machine learning system 120 may be illustrated as a separate node in the FIG. 1, it shall be noted that one or more operations and/or functionalities of the machine learning system 120 may be implemented at the one or more signal receivers 110. For instance, the one or more receivers 110 may function to deploy trained machine learning models, ingest input data, and compute outcomes (e.g., classifications, predictions, probabilities, etc.) using the trained machine learning models. In such embodiment, the one or more receivers 110 may be configured with sufficient computing resources (e.g., GPUs, additional memory, etc.) to implement and process the complex model structures of the one or more machine learning models.

The one or more physical event sources 130 may include any source that generates a radio frequency signal that positively affects noise floor values in a defined zone or environment and that may be actively monitored by the system 100. The one or more physical event sources 130 may include any non-biological or biological physical object that may function to generate, deflect, dampen, or otherwise create or modify signals within in a predefined zone of the one or more radio frequency receivers no. As one or more non-limiting examples, the one or more physical event sources 130 may include, but should not limited to, machinery, computers, biological organisms (e.g., a human presence), objects associated with a biological organism, buildings and building components (e.g., pipes with flowing water, etc.), and the like.

Figure 1A:
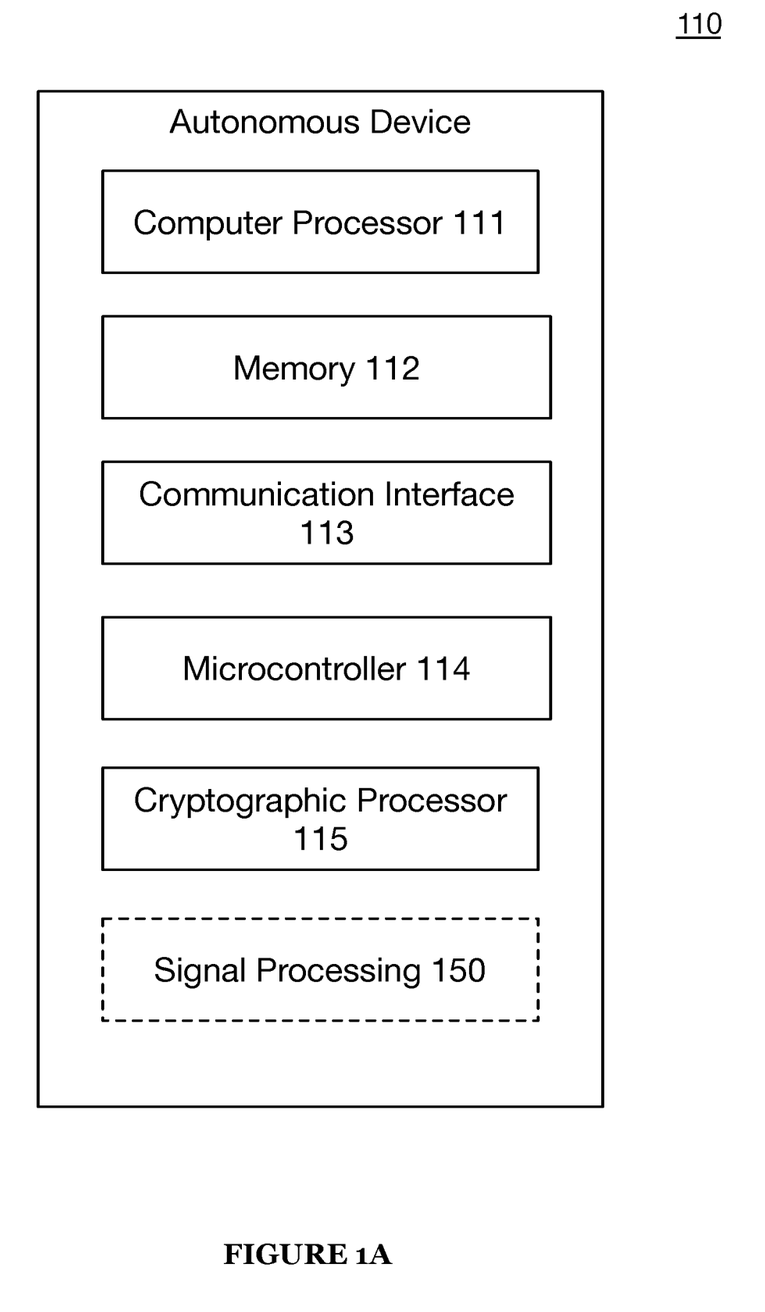
FIG. 1A illustrates a schematic of a signal receiving device of the system 100 in accordance with one or more embodiments of the present application.

The one or more signal receivers 110 may include one or more devices specifically configured to capture a spectrum of signals in an environment. Each of the one or more signal receivers 110 may comprises any type of device including fully autonomous and/or semi-autonomous devices. In a preferred embodiment, each of the nodes and/or devices of system 100 comprise an autonomous device. As shown in FIG. 1A, each autonomous device of system 100 comprises one or more computer processors 111 (or a main central processing unit 111), a memory 112 (static and dynamic memory), and a communication interface 113. In one variation, each autonomous device includes a microcontroller 114 having a small computer on a single integrated circuit containing a processor core, memory, and programmable input/output peripherals. The microcontroller 114, in some embodiments, is used in lieu of the one or more computer processors 111 and in other embodiments, the microcontroller is used in conjunction with the one or more computer processors 111. Additionally, and/or alternatively, the autonomous device includes a cryptographic coprocessor 115 which is a hardware security module or component which provides high security and high-throughput cryptographic subsystems and a crypto-accelerator chip 116, which may be integrated with the cryptographic coprocessor 115. The autonomous device may also include a modulator 117, an oscillator 118, a timer/clock 119, and a power supply 120.

The autonomous device of FIG. 1A may also include traditional elements of a device configured for radio communication at the communication interface 113. Thus, the communication interface 113 of autonomous device of a preferred embodiment includes a radio frequency (RF) scanner 121, RF transmitter 122, RF receiver 123, RF tuner 124, an antenna 125, and a RF amplifier 126.

The autonomous device of FIG. 1A may additionally include signal processing circuitry (e.g., digital signal processor (DSP)) 127 that functions to convert signals from the time or space domain to the frequency domain typically though the Fourier transform or fast Fourier transformation. The Fourier transform converts the signal information collected by the autonomous device to a magnitude and phase component of each frequency.

The memory 112 of the autonomous device in a preferred embodiment includes one or more computer-executable instructions and/or software applications with computer code for executing the functionality and protocols of DIST including Telehash and TMesh (described U.S. patent application Ser. No. 15/345,414, which is incorporated herein by reference in its entirety) and any other functionality or protocols associated therewith, which are described herein required for secure and private communications by and between each of the nodes of the system 100.

The cryptographic coprocessor 115 of the autonomous device may be configured to implement various cryptographic processes including generating, managing, and storing cryptographic keys and encrypting and decrypting cryptographically secured communications. Specifically, each autonomous device using the cryptographic coprocessor 115 is able to generate private/public cryptographic key pairs that can be used to cryptographically secure communication links and sessions between at least two nodes.

The autonomous device may be any type of device (e.g., semi- or fully autonomous), which may be coupled with one or more machines, instruments, components, and/or real world operational devices or elements to sense inputs and/or outputs thereof, to perform actuation operations of one or more components thereof, to perform transactions on behalf of the element or device to which the autonomous device is coupled, and the like. For example, in some embodiments, the autonomous device comprises a sensor that is able to obtain readings and other information relating to or about one or more devices to which the sensor is operably coupled and/or obtain readings about the environment of the one or more devices. Additionally, and/or alternatively, the autonomous device may be an actuator that performs and/or controls one or more actuation operations of a device to which the actuator is a component and/or is operably coupled to. In yet another example, the autonomous device may be a transaction device which brokers transactions on behalf of the device to which it is operably coupled and/or forms a component thereof. The transaction may include an exchange of value for a good, service, or other product offered to the autonomous device or the device to which the autonomous device is coupled. In such example, the autonomous device acting as a transaction device is able to negotiate with other devices and/or other autonomous devices to obtain resources for itself and the device to which it is coupled or provide resources from the device to which it is coupled for a negotiated value or the like from another device or party.

Figure 2:
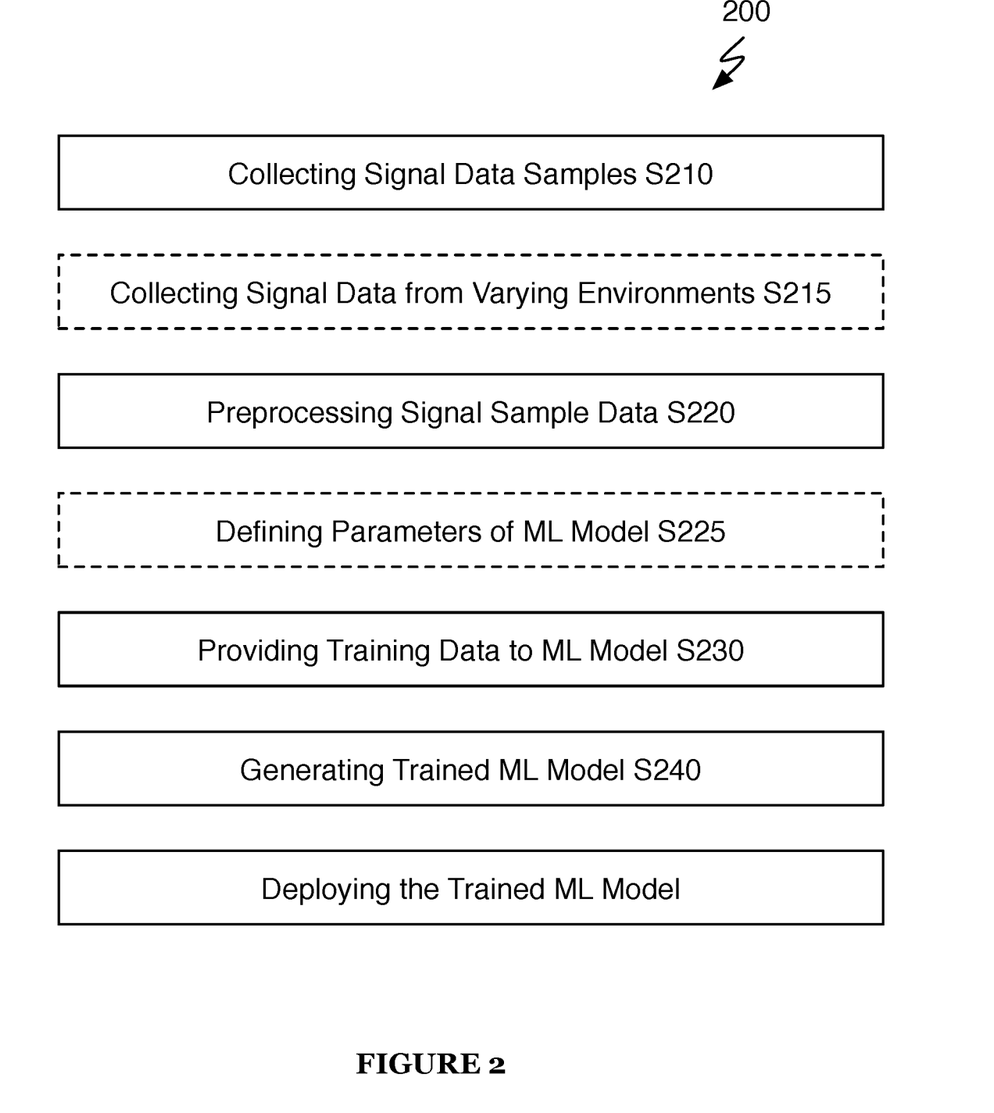
FIG. 2 illustrates a method in accordance with one or more embodiments of the present application.

2. Method for Training & Deploying Radio Frequency Noise Floor Detection System with a Machine Learning Model As shown in FIG. 2, a method 200 for training a machine learning model to classify sensory conditions in an environment using noise floor signal data in accordance with one or more embodiments of the present application. The method 200 includes collecting signal data samples from a physical environment S210, preprocessing the signal sample data S220, providing training data to a machine learning model S230, outputting and storing the trained machine learning model S240, and deploying the trained machine learning model S250. The method 200 optionally includes defining one or more parameters of the machine learning model S225.

S210, which includes collecting signal data samples from a physical environment, functions to aggregate signal data samples at a radio frequency receiver to define noise floor values of natural and/or artificial environmental conditions. The signal sample data may include any type and/or combination of emitted signals that may be irradiated from any signal source into the measured environment. The environment being measured may include a predefined zone that may be defined according to a radius from the radio frequency receiver. In the case of multiple signal receivers in an environment, the defined zone for collecting signal data may be defined by the radial area around each of the radio frequency receivers in the environment.

It shall be noted that while the method 200 preferably functions to collect signal sample data from a physical environment using one or more radio frequency receivers, the method 200 may additionally function to gather signal sample from any suitable source, including third-party data repositories and the like.

The signal data samples from the physical environment may be collected over one or more periods of time and preferably, over short periods of time (e.g., within a few seconds). S210 may function to collect up to one hundred thousand (100,000) signal samples per second or more. A sampling rate used in S210 may be a function of the capabilities of an underlying radio frequency signal receiver used to collect the signal sample data in the environment. In some embodiments, the radio frequency receiver may be a limited or otherwise, constrained device with limited hardware capabilities thereby limiting the signal sampling rate. In some embodiments, a plurality of radio frequency receivers may be implemented by the method 200 for sampling signal data from an environment. In such embodiments, S210 may function to aggregate the signal sample data from each of the plurality of radio frequency receivers to generate a comprehensive noise floor model for a specific environment and/or for specific sensory conditions within the specific environment.

In a preferred embodiment, S210 functions to identify one or more unused bandwidths of the radio frequency spectrum for dynamic noise floor values. The one or more unused bandwidths of the radio frequency spectrum preferably include RF bandwidths on which there are no (or limited) active radio frequency signals being transmitted by a radio frequency transmitter or other radio device in a zone or predefined proximity of the radio frequency receiver that is sampling the environment. That is, while the one or more unused RF bandwidths may include various (passive) signals originating from natural or manmade occurrences or events surrounding the radio frequency receiver, the one or more unused RF bandwidths typically do not include radio frequency signals on which intentional radio frequency signal transmissions are being made. S210 preferably functions to select unused RF bandwidths for RF signal data sampling in a predefined range of 902 MHz-928 MHz; however, it shall be noted that any suitable used or unused RF bandwidth may be selected for signal sample data collection. For instance, if a used or actively used RF bandwidth is used for sampling signal data of an environment, one or more preprocesses may be implemented to reduce or drop from the sample signal data active radio communications identified within the sample signal data before providing the signal sample data as input to a machine learning model or classifier.

Additionally, S210 may function to generate multiple signal sample data sets using selected radio frequency wavelengths within the selected RF bandwidth used by the radio frequency receiver for collecting signal sample data. That is, from the multiple signal sample data collected by the radio frequency receiver, S210 functions to identify or select an RF wavelength or portion thereof (e.g., a fractional arc of radio wavelength) to extract or filter from the many RF wavelengths apparent in the multiple signal samples and once extracted, S210 may aggregate the selected RF wavelength data into a distinct dataset. The selected RF wavelength may be associated with a specific environmental condition or event, which may include, for example, the RF wavelength of a signal irradiated by a continued operation of a machine in the environment. Accordingly, the resulting RF wavelength dataset may represent an RF fingerprint for the specific environmental condition or event. Accordingly, S210 may function to generate a plurality of RF fingerprints for a plurality of distinct sensory conditions within an environment.

For each of a plurality of environmental conditions and/or events identified in an environment, S210 may function to identify an RF wavelength for each condition and/or event and generate a corresponding RF wavelength dataset. With each of the generated RF wavelength sample datasets, S210 may function to associate or augment the RF wavelength dataset with (machine learning) classification information (or classification label) (e.g., condition or event metadata) identifying the relevant condition or event that caused the RF wavelength.

Additionally, or alternatively, S210 may function to collect multiple sets of general signal sample data for an environment based on selecting varying unused RF bandwidths for signal sampling by a radio frequency receiver in the environment. Preferably, S210 functions to select unused RF bandwidths that can be used to generate multiple RF signal models for the environment. Preferably, the RF signal models include radio frequency propagation models that provides a characterization of radio wave propagation as a function of frequency, distance, and other possible conditions. Accordingly, each of the RF signal models may be used to identify or demonstrate a behavior of propagation of radio waves for a specific sensory condition or distinct sensory event. Additionally, or alternatively, each of the RF signal models may be augmented with machine learning classification data and/or machine learning classification labels for at least the purpose of enhancing the machine learning training data sets.

Additionally, or alternatively, the number of unused RF bandwidths selected in S210 may be based on a complexity of the system or environment including complexities in detecting changes in physical characteristics and/or objects therein. Accordingly, including multiple proximate RF bandwidths in the RF signal sampling data for an environment allows for multiple noise floor models for an environment that vary in RF bandwidth that enables the method 200 to detect or capture RF signals of physical properties and/or objects that may be virtually undetectable in some of the RF bandwidths for the environment. Accordingly, S210 may additionally or alternatively function to generate composite RF signal models across multiple RF bandwidths for the purpose of generating a suitable RF signal model that may be used as a training set for detecting virtually undetectable or difficult to detect sensory conditions. A composite RF signal model preferably includes a combination of RF signal models for a distinct sensory condition or distinct sensory event.

Additionally, or alternatively, S215 may function to collect RF signal data samples from a plurality of different environments. For each environment or environment type (e.g., indoor, outdoor, daytime, nighttime, etc.), S215 functions to aggregate sufficient RF signal data sample sizes to accurately define a noise floor model for each of the plurality of different environments. For instance, S215 may function to collect RF signal data samples for, at least, each of an indoor environment, an outdoor environment, daytime or nighttime in each of the indoor and outdoor environments, and the like. S215 may also collect RF signal data samples to consider natural RF signal patterns generated by varying weather conditions (e.g., rain, no rain, wind, lightning, etc.).

S220, which includes preprocessing the RF signal sample data, functions to process the RF signal sample data into a suitable state that enables the machine learning system to properly ingest and interpret the signal sample data. In some embodiments, preprocessing the RF signal sample data may include normalizing the data, performing (fast) Fourier Transforms, concentrating related data samples together, augmenting as metadata one or more high-level extracted feature metrics, etc. Additionally, or alternatively, preprocessing the sample data may include augmenting the collected RF signal sample data with high-level classification data, such as an environment type and/or RF bandwidth data for the collected RF signal sample. Accordingly, some of the classification data may include a label or a description for each of the RF signal data samples collected for each environment. In such embodiments, the training process for the deep learning model may be partially or fully supervised training. However, it shall be noted that unsupervised training may also be implemented. Some example classifications or labels for detectable aspects of the noise floor may include atmospheric noise, cosmic or extraterrestrial noise, man-made noise, thermal noise, and the like. Multiple classifications may be applied to each of the RF signal sampling data prior to providing the RF signal sampling data as training input to the machine learning system or model(s).

Some example classifications or labels for RF wavelength datasets (e.g., RF fingerprint data) may include garage or machinery doors open/closed, vehicle presence nearby (e.g., vehicle operation), human presence nearby (e.g., walking), water flow, temperature increase/decrease, specific object falling, a specific object's movement, and the like.

S220 may generally function to convert the raw RF signal sample data into more functional machine learning input or useable training data input that allows a machine learning model to more effectively process and learn from the training data. It shall be noted that in some embodiments, however, S220 may function to provide the raw RF signal sample data without preprocessing the sample data. In such instances, the machine learning model may be sufficiently advanced to process or learn from the training data based on prior training, such that the preprocessing of the RF signal sample data only provides an incremental benefit to the training of the machine learning model.

Additionally, or alternatively, S220 may function to generate new RF signal sample data by performing one or more modification processes to the collected RF signal sample data. In the case that RF signal sample data of a sufficient size cannot reasonably be collected or is not available to use as training data, S220 may function to artificially modify one or more attributes of the RF signal sample data, such as the signal strength, the frequency, the amplitudes/magnitudes of the RF wavelengths, the harmonics included therein, and any reasonable attribute of the RF signal sample data to achieve additional suitable (artificial) RF signal sample data to be used as training data.

Optionally, S225, which includes defining one or more parameters of the machine learning model, functions to enable parametric implementations into the machine learning model of one or more human-defined or previously-defined machine learning parameters or values. In some embodiments, the one or more parameters provided at S225 may include hyperparameters whose values are set prior to the commencement of the training process of the machine learning model. Hyperparameters provide a base of parameters and/or prior distributions for use in training the machine learning model rather than allowing the machine learning model to self-define some or all parameters during the learning process. It shall be noted that any suitable parameters may be pre-defined for the training of the machine learning model.

S230, which includes providing training data to a machine learning model, functions to provide a plurality of the collected RF signal sample data (either preprocessed or in raw form) to initialize a training process of a machine learning model. Preferably, S230 functions to provide the training data to one or more deep learning models, such as artificial neural network models, convolutional neural network models, or the like. S230 may function to provide the training data to the machine learning model either synchronously or asynchronously.

The training process may initially function to use one or more training algorithms to (randomly) generate feature weights, biases, and transfer functions for training the machine learning model. The training process may implement any type of suitable training algorithm including, but not limited to, backwards propagation of errors, contrastive divergence, conjugate gradient methods, and/or any combination of the foregoing, and the like.

S240, which includes outputting and storing the trained machine learning model, functions to deliver a trained machine learning model once the machine learning model functions to accurately classify or categorize sensory conditions or sensory events based on radio signal data (or noise floor radio signal data) and predict noise floor values for various, dynamic environments. S240 may function to output a combination of model components including one or more of classifiers, auto-encoders, convolutional network structures, recurrent network structures, and the like that define a structure of the machine learning model.

S240 may function to store the structures defining the machine learning model in any suitable manner including, but not limited to, into a program or application having compiled constraints, one or more files, data records in a database, or in a remote cloud (e.g., a distributed computing network).

S250, which includes deploying the trained machine learning model, functions to implement the trained machine learning model, in the field, to ingest noise floor signal data and classify sensory or physical conditions based thereon. S250 may additionally function to provide or generate suitable noise floor models to provide sensory feedback about a current state of an environment. S250 may function to deploy the trained machine learning model as a singular model that is capable of classifying multiple types of disparate environmental conditions and interpreting noise floor values for each of the multiple types of disparate environmental conditions. Additionally, or alternatively, S250 may function to deploy an ensemble of machine learning models with various sub-machine learning models that define the ensemble functioning to perform specific classification tasks. S250 may function to selectively choose one or more (or a subset of) sub-machine learning models of the ensemble to classify and/or make inferences about an environment. The selection in S250 may be based on preliminary input data collected from an environment in which high-level extraction values are generated. Using the high-level extraction values, S250 may function to selectively indicate the one or more sub-machine learning models to implement according to a best fit between the one or more sub-machine learning models and the high-level extraction values. Accordingly, based on a noise floor of an environment only the most suitable (sub) machine learning models may be implemented that may function to provide accurate classifications of events and conditions within the environment.

Figure 3:
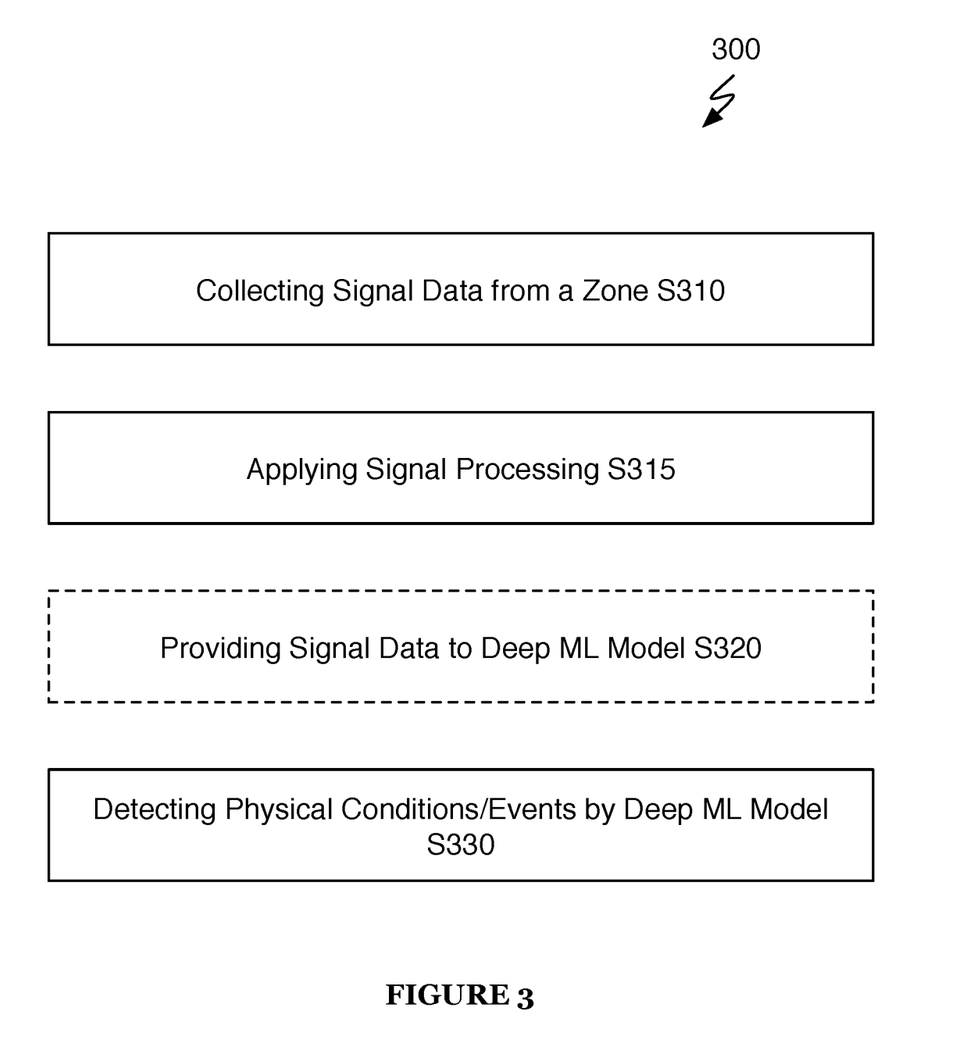
FIG. 3 illustrates another method in accordance with one or more embodiments of the present application.

3. Method for Detecting Physical Characteristics of an Environment Using Radio Frequency Detection Implemented with a Machine Learning Model As shown in FIG. 3, a method 300 for detecting physical conditions and/or events in an environment using a deep machine learning model pre-trained with RF signal data. The method 300 includes collecting signal data from an environment S310, providing the signal data to a deep machine learning model S320, detecting a physical condition and/or an event in the environment S330. The method 300 may optionally include applying one or more signal processing functions against the collected signal data S315.

The method 300 functions to enable a radio frequency receiver or similar device (e.g., an autonomous device) with machine learning capabilities to automatically detect and classify events or conditions in a physical environment proximate to the radio frequency receiver. Preferably, the method 300 functions to define physical noise floor values of the environment surrounding the radio frequency receiver for a deep machine learning model. In some embodiments, the method 300 may optionally function to use an RF spectrum analyzer to analyze the signal strengths, frequencies, harmonics, and the like of incoming frequency signals to define one or more characteristics of a radio frequency noise floor and generate one or more (graphical) illustrations (e.g., spectrogram) showing a frequency spectrum of the noise floor. Further, the method 300, using one or more machine learning models, enables the radio frequency receiver to detect events and/or objects in the physical environment based on RF signal data in the defined noise floor values. Accordingly, in method 300, the radio frequency receiver in combination with a deep learning model may function to detect events, conditions, and/or objects only by receiving radio frequency signals generated by, modified by, and/or included in the radio signal data of the physical environment and objects therein. In other words, some embodiments of the method 300 may use different techniques than traditional radar functionality that includes transmitting a signal by a transmitter and receiving response signals by a receiver to detect events or physical properties in the environment.

S310, which includes collecting signal data from an environment, functions to collect noise floor signal data within a predetermined RF bandwidth from within an environment within proximity of a radio frequency receiver. S310 preferably functions to periodically collect signal data according to an operation or waking schedule of the radio frequency receiver. In some embodiments, S310 may function to initiate signal data collection based on one or more triggers (e.g., an occurrence in the environment, receiving a communication signal from a neighboring receiver or radio devices, etc.). The one or more triggers may function to automatically initiate signal data collection by the radio frequency receiver. However, in some embodiments, S310 may function to continuously collect signal data within the environment. The continuous collection of signal data may be suitable when the radio frequency receiver includes an unlimited or otherwise, significant energy source for continued operations, when the radio frequency receiver possesses sufficient data storage capacity or data communications capacity (e.g., bandwidth over a network), or in critical situation (e.g., emergency situations) when monitoring physical conditions in an environment may be a priority.

Optionally, S315, which includes applying one or more signal processing functions against the collected signal data, may function to perform one or more preliminary signal processing functions (or preprocessing functions) against the signal data to make it suitable for ingestion by the deep machine learning model. For instance, S315 may function to perform fast Fourier Transforms of various portions of the radio signal data. Additionally, S315 may function to implement a spectrum analyzer that enables the generation of useful information from the signal data (e.g., RF histograms, etc.).

S320 functions to provide the signal data to the deep machine learning model. In some embodiments, when the deep machine learning model is hosted on a remote computing node (e.g., a remote server or high-compute power RF receiver), S320 functions to transmit the signal data via a communication network. The communication network is preferably a local network only accessible to nodes (e.g., a plurality of radio frequency receivers, a plurality of autonomous devices, etc.) implementing the method 300. The transmissions between the nodes via the network may be cryptographically secured, as described in U.S. patent application Ser. No. 15/345,392, which is incorporated by reference herein in its entirety.

Additionally, or alternatively, when the deep machine learning model is implemented locally at the radio receiver, S320 may function to provide the signal data to the local deep learning modules of the radio frequency receiver for processing thereon.

S330, which includes detecting a physical condition and/or an event in the environment, functions to ingest the signal data at the deep learning model and detect one or more physical conditions or physical events within the environment. In one embodiment, the deep learning model may operate as a deep learning classifier that functions to ingest the signal data and output one or more classification labels indicating a type or category of physical condition, physical activity, physical object, physical characteristic, and the like that is detected in the physical environment surrounding the radio frequency receiver. In such embodiments, the output of the one or more classification labels by the deep learning classifier may be used input for automating one or more responses by one or more devices operating in proximity of the radio frequency receiver.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application-specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A system for deploying a deep machine learning classifier that classifies pre-trained sensory conditions within a physical environment based on radio frequency noise floor signal data, the system comprising:
   one or more radio signal receivers that:
      are set to receive radio signals from an unused radio frequency band, wherein the unused radio frequency band relates to a radio frequency band that is not used by one or more active radio signal transmitters within a predetermined distance of the one or more radio signal receivers;
      collect radio signal data within the unused radio frequency band from one or more regions within the predetermined distance of each of the one or more radio signal receivers;
   a machine learning-based system that includes a trained deep machine learning classifier, wherein the trained deep machine learning classifier identifies features of one or more sensory conditions and/or sensory events based on the collected radio signal data, wherein the machine learning-based system:
      identifies a plurality of distinct sensory-based conditions and/or sensory-based events based on the radio signal data collected by each of the one or more radio signal receivers;
      generate a radio frequency (RF) wavelength dataset for each of the plurality of distinct sensory-based conditions and/or sensory-based events, wherein the RF wavelength dataset for each of the plurality of distinct sensory-based conditions and/or sensory-based events includes radio wavelength data generated by the respective distinct sensory-based condition and/or sensory-based event;
      generates a distinct classification label for the RF wavelength dataset for each of the plurality of distinct sensory-based conditions and/or sensory-based events, wherein the distinct classification label identifies the respective sensory-based condition and/or sensory-based event; and
      augments the distinct classification label to the RF wavelength dataset for each of the plurality of distinct sensory-based conditions and/or sensory-based events;
   during a training phase of one or more machine learning models, receives machine learning training input for training the one or more machine learning models, the machine learning training input comprising the RF wavelength dataset for each of the plurality of distinct sensory-based conditions and/or sensory-based events augmented with the distinct classification label;
   after the training phase, deploys a radio signal receiver employing the one or more machine learning models that automatically detects and/or classifies events or conditions in a physical environment as one or more of the plurality of distinct sensory-based conditions and/or sensory-based events.

2. The system according to claim 1, wherein
   the one or more machine learning models output one or more classification labels based on radio signal data in the physical environment,
   the one or more classification labels are used as input by one or more autonomous devices, and
   in response to the one or more classification labels, triggering one or more automatic actions by the one or more autonomous devices, wherein the one or more automatic actions by the one or more autonomous devices includes one or more of recording details of the one or more pre-trained sensory conditions associated with the one or more classification labels, performing an actuation in response to detecting the one or more pre-trained sensory conditions, and generating and transmitting a communication comprising details of the one or more pre-trained sensory conditions.

3. The system according to claim 1, further comprising:
   a plurality of radio frequency receivers, wherein each of the plurality of radio frequency receivers collects radio signal data within a distinct unused radio frequency band from the one or more regions within the predetermined distance of each of the plurality of radio frequency receivers.

4. The system according to claim 1, wherein:
   the radio signals originate from one or more physical event sources that generate radio frequency signals that affect noise floor values in the one or more regions, wherein the one or more physical event sources include non-bio-logical or biological physical objects that affect noise floor values in the one or more regions monitored by the one or more radio signal receivers.

5. A method of using a machine learning model to detect physical characteristics of an environment based on radio signal data, the method comprising:
   at a radio signal receiver, collecting noise floor signal data comprising radio signal data from an environment within a predetermined proximity of the radio signal receiver;

implementing a deep machine learning classifier that identifies features of one or more sensory conditions and/or sensory events is trained to classify one or more physical characteristics of the environment based on the radio signal data;

identifying a plurality of distinct sensory-based conditions and/or sensory-based events based on the radio signal data collected by each of the one or more radio signal receivers;

generating a radio frequency (RF) wavelength dataset for each of the plurality of distinct sensory-based conditions and/or sensory-based events, wherein the RF wavelength dataset for each of the plurality of distinct sensory-based conditions and/or sensory-based events includes radio wavelength data generated by the respective distinct sensory-based condition and/or sensory-based event;

generating a distinct classification label for the RF wavelength dataset for each of the plurality of distinct sensory-based conditions and/or sensory-based events, wherein the distinct classification label identifies the respective sensory-based condition and/or sensory-based event;

augmenting the distinct classification label to the RF wavelength dataset for each of the plurality of distinct sensory-based conditions and/or sensory-based events;

during a training phase of one or more machine learning models, receiving machine learning training input for training the one or more machine learning models, the machine learning training input comprising the RF wavelength dataset for each of the plurality of distinct sensory-based conditions and/or sensory-based events augmented with the distinct classification label; and after the training phase, deploying a radio signal receiver employing the one or more machine learning models that automatically detects and/or classifies events or conditions in a physical environment as one or more of the plurality of distinct sensory-based conditions and/or sensory-based events.

6. The method according to claim 5, wherein the plurality of distinct sensory conditions and/or sensory events within the environment include one or more of an operation of machinery, a presence of a vehicle, a presence of a human, a time of day, and a weather condition.

7. The method according to claim 5, further comprising:
training the deep machine learning classifier, wherein the training includes:
  collecting by a radio signal receiver at a set radio frequency band one or more samples of noise floor signal data from a physical environment for at least one active sensory condition; and
  providing training data to the deep machine learning classifier, wherein the training data comprises one or more portions of the one or more samples of noise floor signal data for the at least one active sensory condition.

8. The method according to claim 5, further comprising:
preprocessing the samples of radio signal data by applying one or more signal processing functions to the collected radio signal data including one or more of:
  performing fast Fourier Transform of one or more portions of the radio signal data; and
  implementing a radio frequency spectrum analyzer that generates one or more graphical representations of the radio signal data, wherein the training data comprises the one or more portions of the radio signal data that is transformed by fast Fourier Transform and the one or more graphical representations of the radio signal data.

9. The method according to claim 7, further comprising:
generating a noise floor model for each of a plurality of distinct sensory conditions and/or sensory events based on the samples of radio signal data;
providing training data comprising the noise floor model for each of the plurality of distinct sensory conditions and/or sensory events.

10. The method according to claim 5, wherein
the one or more machine learning models output one or more classification labels based on radio signal data in the physical environment,
the one or more classification labels are used as input by one or more autonomous devices, and
in response to collecting the one or more classification labels, triggering one or more automatic actions by the one or more autonomous devices, wherein the one or more automatic actions by the one or more autonomous devices includes one or more of recording details of the one or more sensory conditions and/or sensory events associated with the one or more classification labels, performing an actuation in response to detecting the one or more sensory conditions and/or sensory events, and generating and transmitting a communication comprising details of the one or more pre-trained sensory conditions.

11. The method according to claim 5, further comprising:
implementing a plurality of networked radio signal receivers, wherein each of the plurality of networked radio signal receivers implements a distinctly trained deep machine learning classifier, wherein the distinctly trained deep machine learning classifier at each of the plurality of networked radio signal receivers classify different sets of pre-trained sensory conditions.

12. The method according to claim 7, wherein
if the one or more samples of noise floor signal data from the physical environment that are collected by the radio signal receiver are insufficient for training the deep machine learning, generating additional machine learning input by modifying one or more features of the one or more samples of noise floor signal data to generate one or more samples of artificial noise signal data;
providing to the trained deep machine learning classifier training data comprising the one or more samples of artificial noise signal data.

13. The method according to claim 5, further comprising:
at a second radio signal receiver:
  collecting noise floor signal data from the environment using a different unused radio frequency band;
  augmenting the machine learning input with the noise floor signal data collected by the second radio frequency receiver;
  generating by the deep machine learning model one or more classification labels identifying the one or more physical characteristics of the environment based on the noise floor signal data from the radio signal receiver and the second radio signal receiver.

14. The system according to claim 1, wherein
the system further:
  identifies a plurality of proximate radio frequency (RF) bandwidths within the predetermined distance of each of the one or more radio signal receivers;

collects, using the one or more radio signal receivers, radio signal data from each of the plurality of proximate RF bandwidths;

generates a noise floor model based on the radio signal data from each of the plurality of proximate RF bandwidths; and generates a composite RF signal model for a distinct sensory condition and/or distinct sensory event, the composite RF signal model combining the noise floor model for each of the plurality of proximate RF bandwidths, wherein during the training phase of the one or more machine learning models, providing the composite RF signal model as machine learning input for training the one or more machine learning models to detect and/or classify the distinct sensory condition and/or distinct sensory event.

* * * * *

UNITED STATES PATENT AND TRADEMARK OFFICE
CERTIFICATE OF CORRECTION

PATENT NO. : 10,408,913 B2  
APPLICATION NO. : 16/055361  
DATED : September 10, 2019  
INVENTOR(S) : Jeremie Miller Page 1 of 1

It is certified that error appears in the above-identified patent and that said Letters Patent is hereby corrected as shown below:

Column 16, Line 53:
In Claim 4, delete "wherein:" and insert --wherein-- therefor Signed and Sealed this
Eighteenth Day of February, 2020

Andrei Iancu
*Director of the United States Patent and Trademark Office*